UNITED STATES PATENT OFFICE.

CHARLES A. JORDERY, OF PARIS, FRANCE.

IMPROVEMENT IN SOLIDIFYING OILS.

Specification forming part of Letters Patent No. 126,552, dated May 7, 1872.

*To whom it may concern:*

Be it known that I, CHARLES ALFRED JORDERY, of Paris, France, have invented certain new and useful Improvements in Solidifying Oils, and especially the oils of petroleum and schist, and the volatile essences thereof, of which the following is a specification:

The object of my invention is to obviate several inconveniences which are experienced in transporting and handling petroleum, oils of schist, and their volatile essences, as well as oils in general. These products, by reason of their fluidity, are difficult to transport, and spread over all substance or bodies with which they come in contact; and, as regards the petroleum and other volatile oils, develop inflammable vapors, which, besides being dangerous, constitute quite a serious loss.

To remedy these difficulties I have solidified these oils so as to obtain a new industrial product of a greater consistency, and disengaging or giving of less vapor, and capable of being transported and handled with greater facility.

To accomplish this result I proceed as follows: I prepare a solution, decoction, or extract of soapwort root (*saponaria officinalis*) or leaves, Panama-wood or Quillay-wood, (*quillaga,*) or any other substance having saponifying properties, such as *gypsophilum strutium*.

To effect the solidifying of the oil I place in a suitable vessel a quantity of the solution or decoction equal to one twentieth part of the quantity of petroleum, oil, or essence to be treated, which is caused to enter the vessel in a small continuous stream in order to effect the intimate mixture of the two substances, which is brought about by continuous agitation or stirring by any suitable means. An excess of the liquid to be solidified will do no damage, as this excess will remain free, and can be drawn off when the contents are at rest.

The operation may be made more rapid by changing the proportions, placing in the cylinder twenty liters of the saponifying liquid extract to eighty liters of petroleum or other oil, thrown all at once into the vessel. The contents of the vessel being briskly and suddenly agitated solidification takes place, imperfectly at first, then there will be a separation of some fifteen liters of the saponifying substances employed in excess, which will fall to the bottom of the vessel, leaving the solidified petroleum or other oil floating on top. The excess of saponifying extract can be drawn off and used in another operation.

The new solidified product which I thus obtain remains combustible, although it will disengage or give off much less of vapor than will the same oil in its ordinary fluid state, and under the same conditions of temperature.

A noticeable property of this solidified product is, that when placed in a mass of truncoconical or other suitable shape on a permeable body—such as wood, for instance—it will not, when set on fire, spread over the wood, but the flame remains entirely within the limits of the space occupied by the product on the wood in the first instance, while, on the other hand, under the same conditions, petroleum or other volatile liquid products would be immediately spread over all the surface so as to set the whole on fire.

When the oil is thus solidified it can be transported with facility. If, afterward, it is desired to bring it back to its ordinary liquid state, it will be sufficient, if the oil is crude, to employ the process of distillation ordinarily used in purifying crude petroleum, which, in this instance, will serve the double purpose of liquefying and purifying the product.

In case refined petroleum and volatile oils are to be liquefied they may be submitted to a heat of 60° centigrade in a sand-bath, which, in the course of some hours, will effect the separation. The same process may be employed for oils in general, but in this case a higher heat will be needed, and it will be necessary to considerably augment the degree of heat in order to obtain a speedy action.

In order to destroy the emulsion and bring back to a liquid state refined petroleum and volatile oils thus solidified, still another process may be employed, as follows: A light solution of gum lac in alcohol is prepared, several centimeters of which are poured over and maintained upon the surface of the solidified oil, a fine sieve being used to cause the liquid to spread over the whole surface and diffuse itself through the whole mass. The saponifying matter will separate from the oil, which is thus restored to its liquid state.

In the case of solidified essences the same process may be employed, with the substitution of acetic acid for the solution above mentioned, which acid combines with the saponifying agent. To restore the acetic acid the ordinary processes may be employed so as to fit the acid for use in subsequent operations.

It will be understood that the proportions herein given may be varied, as well, also, as the saponifying agents, without departure from the principle of my invention.

What I claim, and desire to secure by Letters Patent, is—

1. As a new product or article of manufacture, solidified petroleum, schist, or other oil or essence, prepared substantially in the manner and by the means herein set forth.

2. The process herein described of solidifying petroleum and other oils by saponification, in the manner and for the purposes set forth.

3. The refining of the solidfied product, substantially in the manner and by the means herein set forth.

4. The liquefying of the solidified product, substantially in the manner and by the means set forth.

In testimony whereof I have signed my name to this specification before two subscribing witnesses.

C. A. JORDERY.

Witnesses:
 J. MARWIN,
 EMIL RANAULT.